(12) United States Patent
Boal, Jr.

(10) Patent No.: US 6,796,463 B2
(45) Date of Patent: Sep. 28, 2004

(54) INFLATABLE AND COLLAPSIBLE APPARATUS FOR DISPENSING FLUID FROM A FLUID VESSEL

(75) Inventor: Stewart Boal, Jr., 3806 Northwood Ave., Peoria, IL (US) 61614

(73) Assignee: Stewart Boal, Jr., Peoria, IL (US)

(*) Notice: Subject to any disclaimer, the term of this patent is extended or adjusted under 35 U.S.C. 154(b) by 185 days.

(21) Appl. No.: 09/989,701

(22) Filed: Nov. 21, 2001

(65) Prior Publication Data

US 2003/0066844 A1 Apr. 10, 2003

Related U.S. Application Data

(63) Continuation-in-part of application No. 09/971,623, filed on Oct. 9, 2001, now abandoned.

(51) Int. Cl.$^7$ ................................................. B67D 5/42
(52) U.S. Cl. ........................ 222/389; 222/386.5; 222/1; 138/93; 220/239; 251/61.1
(58) Field of Search ...................... 222/95, 389, 386.5; 138/93; 220/239; 251/61.1

(56) References Cited

U.S. PATENT DOCUMENTS

| | | | |
|---|---|---|---|
| 9,466 A | 12/1852 | Polley | |
| 1,816,527 A | 7/1931 | Hastings | |
| 2,843,154 A | * 7/1958 | Hosking | ...................... 138/93 |
| 3,583,491 A | 6/1971 | Lindeberg | |
| 3,669,320 A | 6/1972 | Purcell, Jr. | |
| 3,828,988 A | 8/1974 | Berry | |
| 3,870,085 A | * 3/1975 | Schneider | ...................... 138/93 |
| 3,883,046 A | 5/1975 | Thompson et al. | |
| 4,213,545 A | * 7/1980 | Thompson et al. | ...... 222/386.5 |
| 4,721,235 A | 1/1988 | Watson | |
| 4,744,130 A | 5/1988 | Epstein et al. | |
| 4,817,830 A | 4/1989 | Yavorsky | |
| 4,877,156 A | 10/1989 | Clanet et al. | |
| 5,114,054 A | 5/1992 | Watson | |
| 5,150,820 A | * 9/1992 | McGill | ......................... 222/95 |
| 5,341,726 A | 8/1994 | Watson | |
| 5,372,162 A | * 12/1994 | Frey | ............................. 138/98 |
| 5,385,081 A | 1/1995 | Sneddon | |
| 5,598,762 A | 2/1997 | Sneddon | |
| 5,746,112 A | 5/1998 | Watson | |
| 6,027,123 A | 2/2000 | Berry, Sr. et al. | |
| 6,119,775 A | 9/2000 | Drechsler et al. | |
| 6,206,248 B1 | 3/2001 | Popp et al. | |
| 6,234,351 B1 | 5/2001 | Wilcox | |

FOREIGN PATENT DOCUMENTS

| | | |
|---|---|---|
| EP | 0 239 491 | 9/1987 |
| EP | 0 689 932 | 3/1996 |

* cited by examiner

*Primary Examiner*—Kenneth Bomberg
*Assistant Examiner*—Melvin Cartagena
(74) *Attorney, Agent, or Firm*—Pillsbury Winthrop LLP

(57) ABSTRACT

The present invention provides an apparatus for sealing a portion of a fluid vessel. The apparatus includes an inflatable and collapsible enclosed structure constructed and arranged to transition between an inflated configuration and a collapsed configuration when pressurized fluid is received therein and released therefrom, respectively. The apparatus includes at least one annular seal member protruding from an outer surface of the enclosed structure, wherein the annular seal member is constructed and arranged to engage an inner surface of the fluid vessel to form a fluid tight seal between the inner surface and the outer surface of the enclosed structure when the enclosed structure is disposed therein and pressurized to substantially the inflated configuration.

9 Claims, 16 Drawing Sheets

INFLATABLE AND COLLAPSIBLE APPARATUS FOR DISPENSING FLUID FROM A FLUID VESSEL

This application is a continuation-in-part and claims the benefit of Boal, Jr., U.S. application Ser. No. 09/971,623, filed on Oct. 9, 2001, now abandoned, the entire contents of which are hereby incorporated into the present application by reference.

BACKGROUND OF THE INVENTION

1. Field of the Invention

The present invention relates to an apparatus, such as a piston, used to dispense fluids from fluid vessels.

2. Description of Related Art

A method of dispensing fluids from a fluid vessel, such as a tank, may involve the use of a rigid piston disposed inside the tank to drive the fluid therefrom. The rigid piston is pushed through the tank during the dispensing process by the use of pressurized air, nitrogen or any other suitable gas. The piston typically includes annular seal rings that form a seal between the inner surface of the tank and the piston, and which wipe the interior of the tank as the rigid piston is pushed through the tank.

Since the piston is rigid and larger than any orifice provided on the tank, the tank is typically manufactured with the piston installed in the tank. Thus, the rigid piston is actually part of the tank and cannot be removed without dismantling the tank. As such, the rigid piston can only be used in a single, given tank for which it is installed. The rigid piston is also made to be fairly long in order to accommodate spaced apart pads that protrude therefrom and engage the inner surface of the tank, such as that described in U.S. Pat. No. 4,721,235. These pads help to prevent canting as the rigid piston moves through the tank. As such, the rigid piston occupies a large volume of space that could otherwise be used to store fluid.

SUMMARY OF THE INVENTION

It would therefore be desirable to provide an apparatus for dispensing a fluid from a fluid vessel that does not possess the above mentioned drawbacks. The present invention provides an apparatus for sealing a portion of a fluid vessel. The apparatus includes an inflatable and collapsible enclosed structure constructed and arranged to transition between an inflated configuration and a collapsed configuration when pressurized fluid is received therein and released therefrom, respectively. The apparatus includes at least one annular seal member protruding from an outer surface of the enclosed structure, wherein the annular seal member is constructed and arranged to engage an inner surface of the fluid vessel to form a fluid tight seal between the inner surface and the outer surface of the enclosed structure when the enclosed structure is disposed therein and pressurized to substantially the inflated configuration.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein.

DETAILED DESCRIPTION

Figure 1:
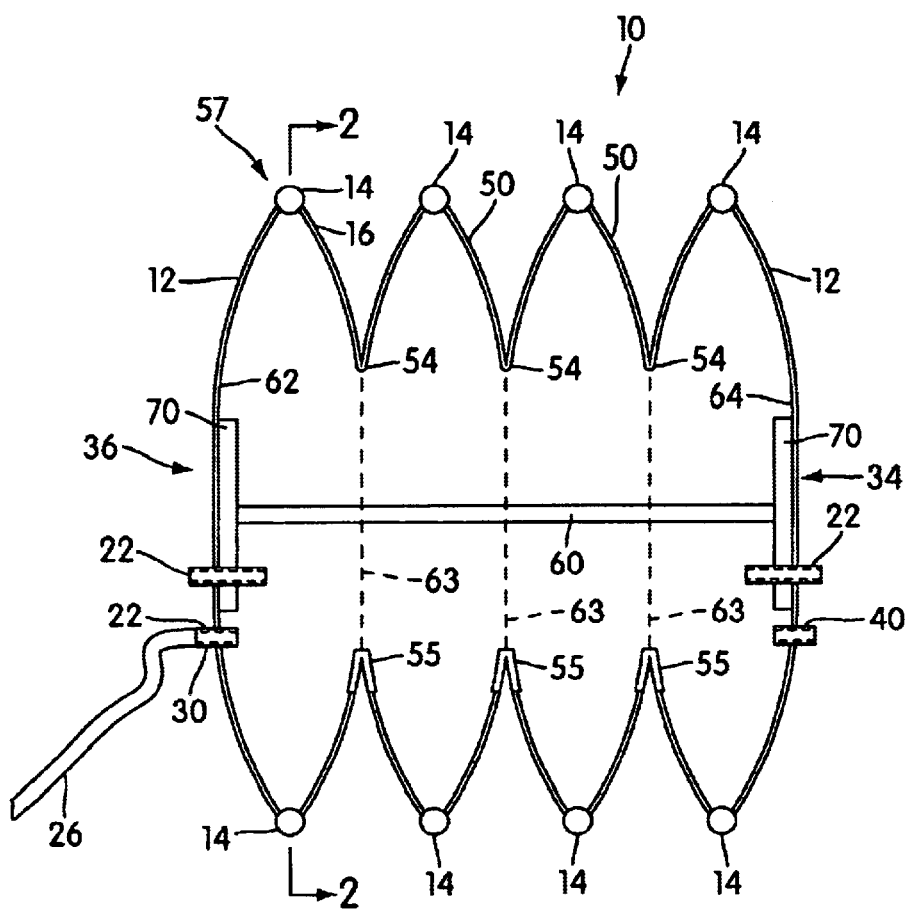
FIG. 1 is a cross sectional view of an embodiment of the apparatus shown in substantially the inflated configuration.
Figure 2:
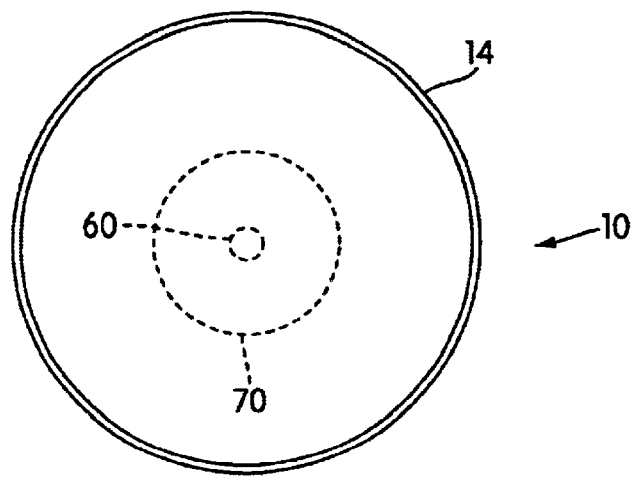
FIG. 2 is a section view along line 2—2 of FIG. 1.
Figure 3:
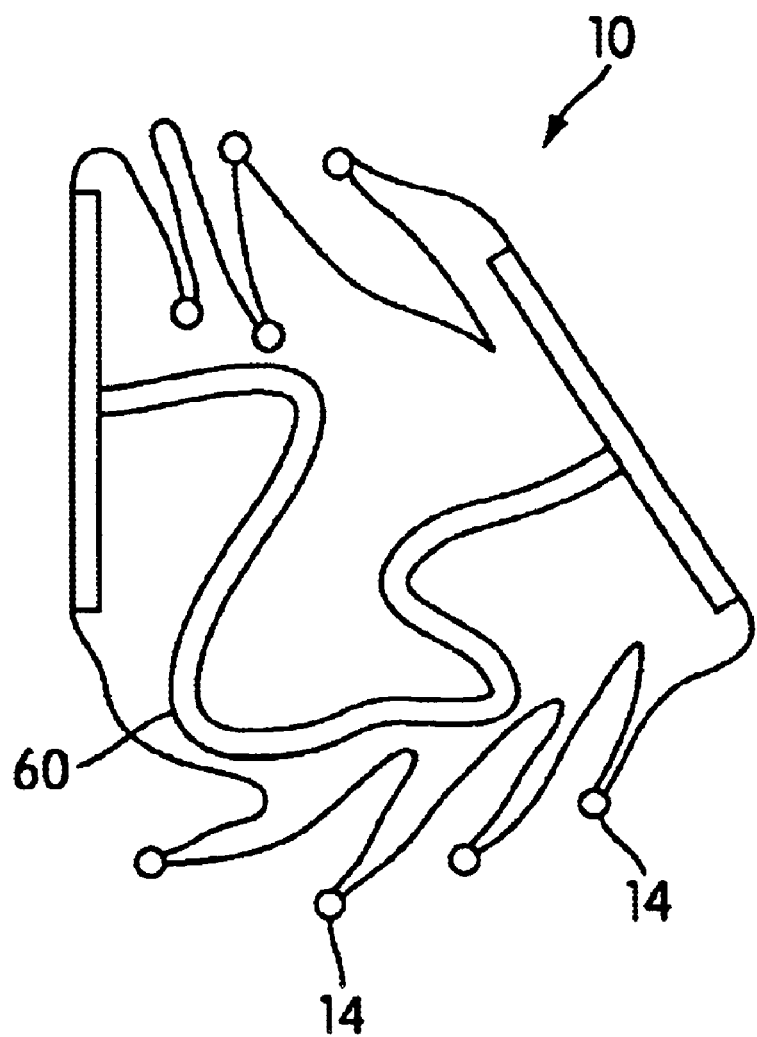
FIG. 3 is a cross sectional of the apparatus of FIG. 1 shown in a collapsed configuration.

Referring now more particularly to the drawings, an embodiment of the apparatus of the present invention, generally indicated at 10, is shown in FIGS. 1–4. The apparatus 10 includes an inflatable and collapsible enclosed structure 12 and at least one annular seal member 14. The enclosed structure 12 of the apparatus 10 is constructed and arranged to transition between an inflated configuration (shown, for example, in FIG. 1) and a collapsed configuration (shown, for example, in FIG. 3) when pressurized fluid is received therein and released therefrom, respectively. The enclosed structure 12 may have generally a circular cross-section when inflated to substantially the inflated configuration. Of course, any cross-section could be used, but the circular cross-section is illustrated because fluid vessels with a cylindrical wall are the most common.

The at least one seal member 14 protrudes from an outer surface 16 of the enclosed structure 12, the at least one seal member being constructed and arranged to engage an inner surface 18 (FIG. 4) of a fluid vessel 20 to form a seal therebetween when the enclosed structure is disposed therein and pressurized to substantially the inflated configuration. The fluid vessel 20 can be any type of structure for containing or delivering fluid, such as a tank or a pipe, respectively. Where the fluid vessel and enclosed structure 12 (when in substantially the inflated configuration) have a circular cross section, the seal member 14 may be annular, as shown.

The pressurized fluid used to inflate the enclosed structure 12 may include a gas, such as air, nitrogen, or any other suitable gas. Alternatively, the fluid may include a liquid, such as hydraulic fluid, or any other suitable fluid, that is received in the enclosed structure and pressurized with a hydraulic device. The enclosed structure 12 is made from a suitable flexible material which can maintain a pressurized fluid received therein. For example, the enclosed structure may be made of a flexible polymeric material, such as rubber or a synthetic rubber. Alternatively, the enclosed structure 12 may be made of a woven fabric material. The enclosed structure 12 may further be made of a combination of a polymeric material and woven fabric material. That is, a portion of the structure may be made of rubber and another portion made of the woven fabric material and the separate portions connected together such that their interfaces are made to be "air tight." The enclosed structure 12 may also be made of a composite material of, for example, a polymeric material and woven fabric material. The apparatus 10 may include at least one valve 22 fixedly mounted to the enclosed structure 12 for introducing pressurized fluid therein. The at least one valve 22 may include a plurality of valves. The valve 22 is constructed and arranged in known manner such that a hose 26 can be removably attached thereto and used to inflate the enclosed structure. The valves 22 may be mounted to both end portions 34, 36 of the enclosed structure 12 so that the hose 26 can be attached at either side 36, 34 thereof. A portion of the valve 22, namely a tube portion 30, may be integrally formed with the enclosed structure 12, or the tube portion can be fixedly attached to the structure in a known manner to form an air tight interface therebetween.

Figure 4:
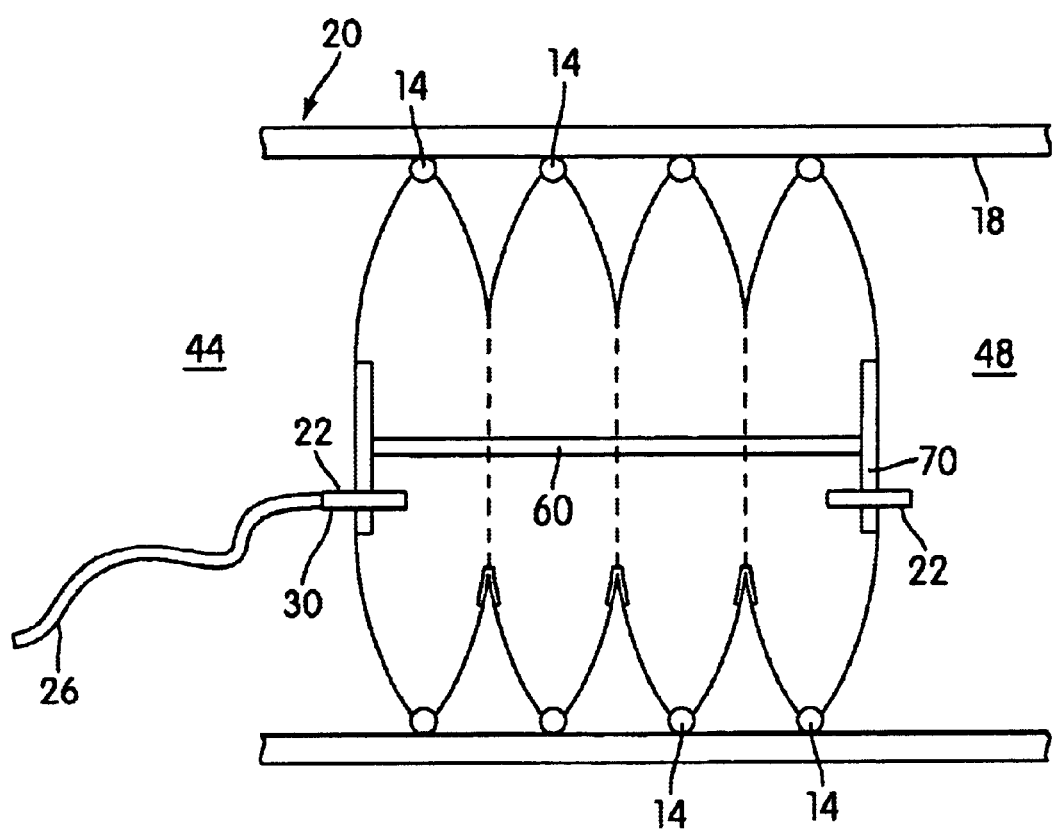
FIG. 4 is a cross sectional of the apparatus of FIG. 1 shown in substantially the inflated configuration within a fluid vessel.

Each valve 22 may be operatively switcheable between at least one of a closed/sealed position, an open position for introducing pressurized fluid within the enclosed structure, and an open position for releasing the pressurized fluid from the enclosed structure. Alternatively, the apparatus 10 may include one or more second valves 40 dedicated to releasing the pressurized fluid. As discussed, the apparatus 10 includes at least one seal member 14 mounted to an outer surface 16 of the enclosed structure 12 and protruding therefrom. The at least one seal member 14 may include a plurality of seal members. The apparatus 10 is to be sized so that when the enclosed structure 12 is disposed within a correspondingly sized fluid vessel 20 and pressurized to substantially the inflated configuration, the at least one seal member 14 slidably engages the inner surface 18 of the containment device to form a seal therebetween, as shown in FIG. 4. More specifically, when the apparatus is disposed within an appropriately sized fluid vessel 20 and an inflated to substantially the inflated configuration, the seal member 14 provides a fluid tight seal so that opposite sides of the seal members 14 generally define separate spaces 44, 48 for housing fluid.

In one embodiment, when the apparatus is substantially in the inflated configuration, the outer surface 16 may include at least one radially protruding portion 50 having an annular, proximal end 57. The at least one radially protruding portion 50 may include a plurality of protruding portions. Where the enclosed structure 12 is integrally formed, the radially protruding portions 50 may be integrally formed therewith. Alternatively, the protruding portions 50 may be constructed from a plurality of material sections that are fixedly attached together to form the continuous enclosed structure 12. In such a case, the material sections may be fixedly attached together at seams 54 by, for example, sewing, fusing, gluing, or otherwise attached, provided that the seams 54 are made to be "air tight." Seams 54 may include reinforcement material 55 that is likewise fixedly attached.

The apparatus 10 may further include at least one radially extending, flexible support 63 that is fixedly attached between diametrically opposite positions of the annular seam 54, as shown in FIG. 1 by the dashed lines. The at least one flexible member 63 may include a plurality of flexible members. The flexible supports 63 may be made of any suitable flexible material, such as, for example, a metal cable, a fibrous or polymeric rope, a rubber or synthetic rubber cord, or other flexible member. The flexible supports 63 provide support against outward, radial expansion of seams 54.

Figure 5:
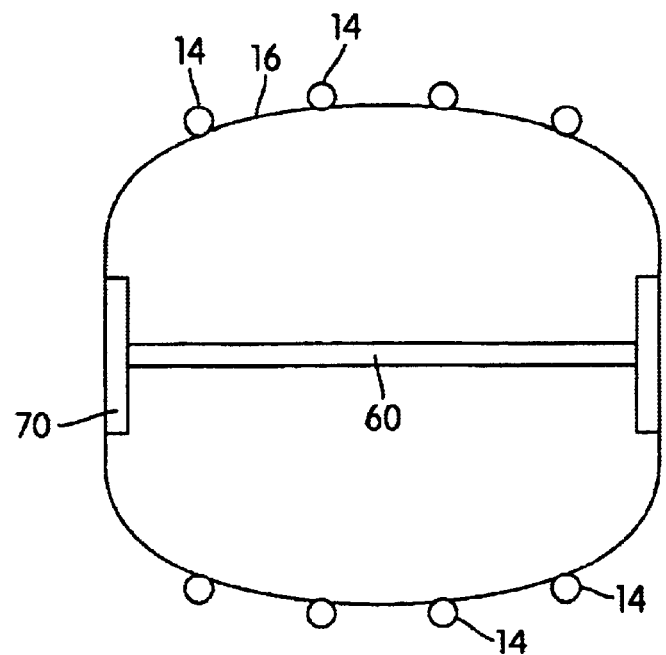
FIG. 5 is a cross sectional of a second embodiment of the apparatus shown in substantially the inflated configuration.
Figure 6:
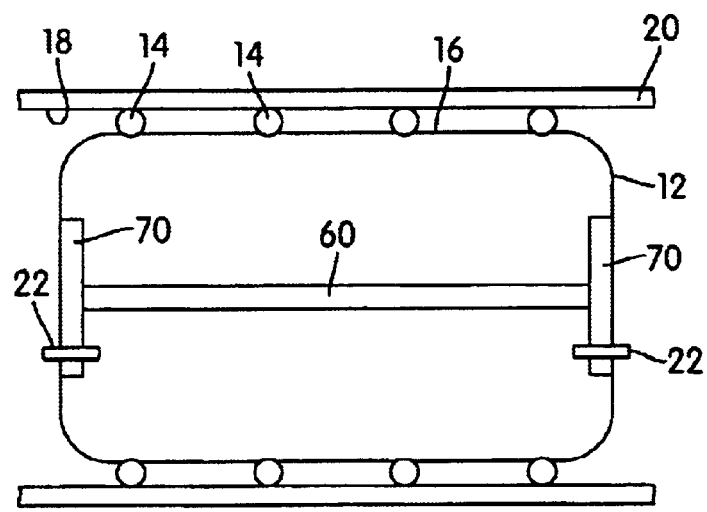
FIG. 6 is a cross sectional view of the apparatus of FIG. 5 shown in substantially the inflated configuration within a fluid vessel.
Figure 7:
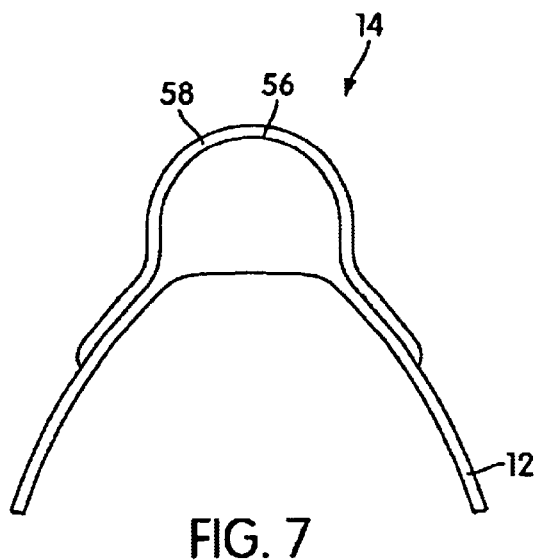
FIG. 7 is a cross sectional view of a seal member integrally formed with the enclosed structure of the apparatus of FIG. 1.
Figures 8, 9:
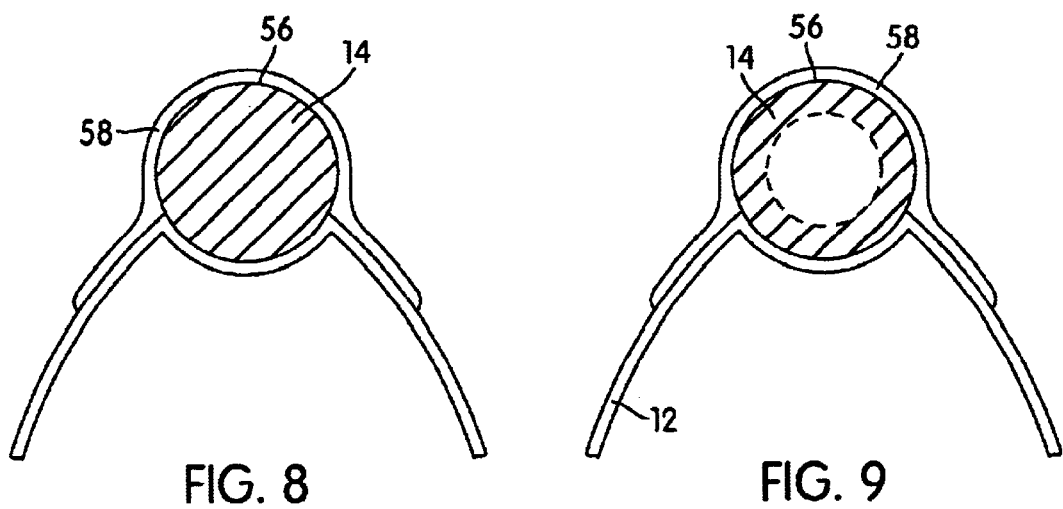
FIG. 8 is a cross sectional view of a seal member fixedly attached to the enclosed structure of the apparatus of FIG. 1.
FIG. 9 is a cross sectional view of a hollow seal member fixedly attached to the enclosed structure of the apparatus of FIG. 1.
Figure 10:
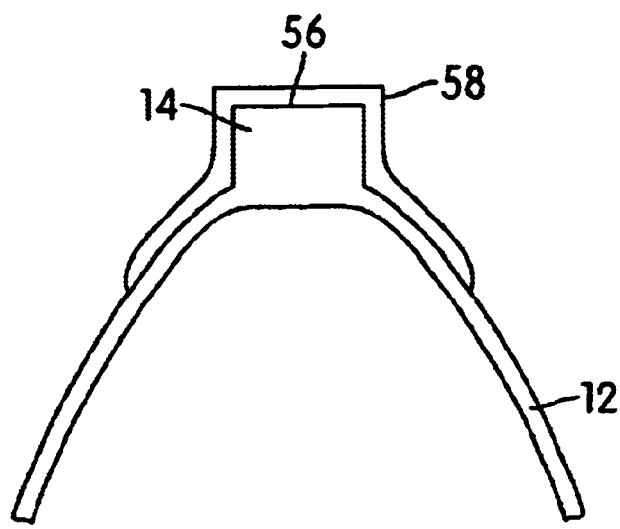
FIG. 10 is a cross sectional view of a rectangularly shaped seal member integrally formed with the enclosed structure of the apparatus of FIG. 1.
Figure 11:
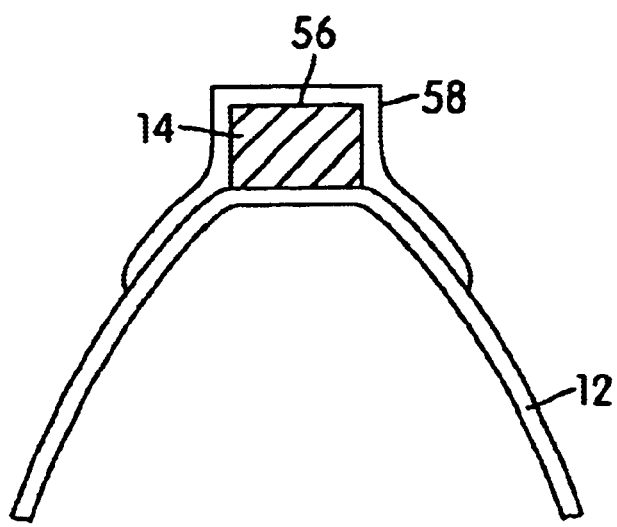
FIG. 11 is a cross sectional view of a rectangularly shaped seal member fixedly attached to enclosed structure of the apparatus of FIG. 1.

The at least one seal member 14 may be fixedly mounted to the outer surface 16 of the enclosed structure 12. Where a plurality of seal members 14 are included, they may be approximately equally spaced in the longitudinal direction along the outer surface 16, as shown in an embodiment of the apparatus in FIGS. 5 and 6 in which the outer surface does not include radially protruding portions 50. Where the outer surface 16 includes the radially protruding portions 50, the seal members 14 are fixedly mounted at the annular, proximal ends 60 thereof (FIG. 1). In either case, the seal members 14 are fixedly mounted to the enclosed structure 12 by, for example, being sewed, fused, glued, a combination thereof, or otherwise fixed thereto (FIGS. 8, 9, and 11). Alternatively, the seal members 14 may be integrally formed with the enclosed structure, as shown in FIGS. 7 and 10.

The seal member 14 may be a polymeric material, such as, for example, rubber or synthetic rubber, or any other suitable material. The synthetic rubber may include, for example, at least one of VITON®, neoprene, and Buna-N (nitrile) rubber having a hardness of approximately 65 durometer (Shore A scale), none of which are intended to be limiting. The seal member 14 may be solid or hollow (FIG. 9). The cross-section of the seal members may be semi-toric, rectangular (FIG. 10), or any other suitable shape. The outer surface 56 of the seal members 14 may be coated with a lubricant layer 58. The lubricant layer 58 may include a layer of TEFLON®, or other material that exhibits a low coefficient of friction, thereby facilitating sliding engagement between the seal members 14 and the fluid vessel 20.

Figure 12:
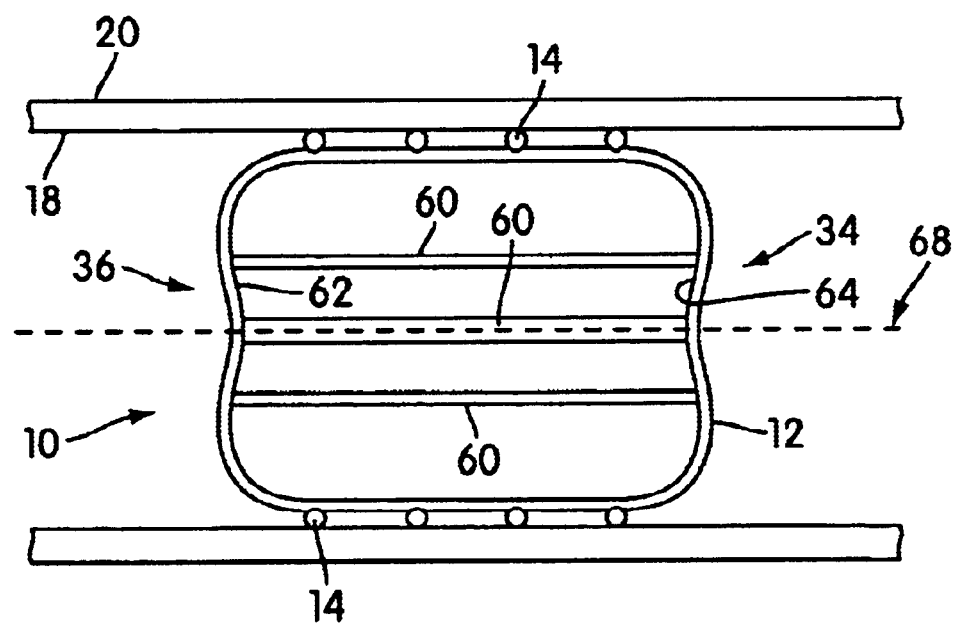
FIG. 12 is a cross sectional view of the apparatus of FIG. 5.

The apparatus 10 may further include at least one structural support member 60 disposed within the enclosed structure 12 and fixedly attached, as is known in the art, to inner surfaces 62, 64 of opposing longitudinal ends 36, 34, respectively, of the enclosed structure 12, as generally shown in FIG. 12. The support member 60 may be attached to each end 34, 36 at the approximate centers thereof. Thus, when in the inflated configuration, the support member 60 extends along the approximate longitudinal axis 68 of the enclosed structure 12. When the enclosed structure 12 of the apparatus 10 is pressurized to substantially the inflated position, the support member 60 provides support against outward, longitudinal expansion of the enclosed structure. More specifically, the support member 60 prevents longitudinal expansion of the enclosed structure beyond, generally, the length of the support member 60.

The support member 60 may be a rigid material, such as a rigid rod. Alternatively, the support member 60 is a flexible material, such as, for example, a metal cable, a fibrous or polymeric rope, a flexible rubber or synthetic rubber rod, or other flexible member. Where the support member 60 is a flexible member, the apparatus 10 can be collapsed into a more compact unit when the pressurized fluid is released from the enclosed structure 12 (see FIG. 3). The support member 60 may also include a rigid, telescopic device (not shown) that can extend and retract in a known manner between a maximum and minimum length, respectively. The at least one support member 60 may include a plurality of support members, the ends being connected to the inner surfaces 62, 64 of the ends 36, 34 of the enclosed structure 12 at various locations about the longitudinal axis 68.

Figure 13:
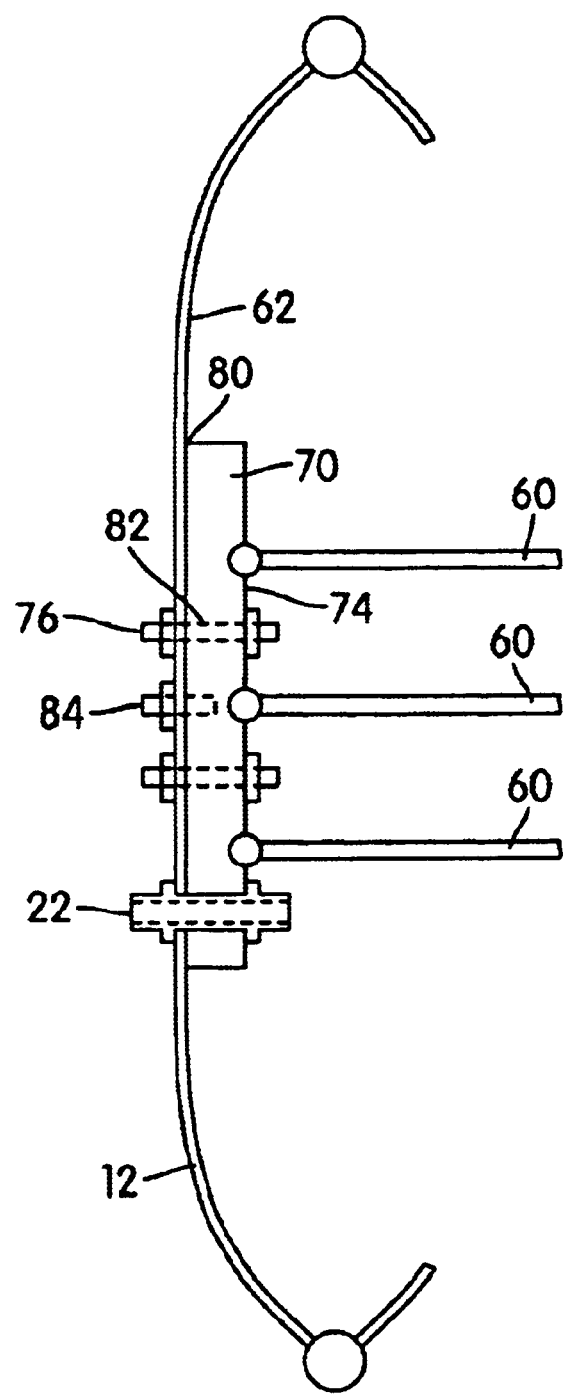
FIG. 13 is a cross sectional view of a end member of the apparatus of FIG. 1.

The apparatus 10 may include at least one substantially rigid end member 70 connected to an end portion 34 (or 36) of the enclosed structure 12 and disposed transverse to the support member 60. The at least one rigid end member 70 may include a pair of end members connected at each end 34, 36. The support member 60 may be attached to an inner surface 74 of each end member 70 at the approximate center thereof, or, where a plurality of support members 60 are included, they may be attached at various locations about the longitudinal axis 68. The end members 70 may be of any shape, including disk shaped. The end members 70 provide a substantially rigid wall portion that supports the corresponding ends 34, 36 of the enclosed structure from outward, longitudinal expansion when in substantially the inflated configuration. More specifically, the end members 70 and support member 60 together generally define a longitudinal, dimensional "boundary" that the enclosed structure occupies when in the inflated configuration. With this boundary, the enclosed structure 12 of the apparatus 10 generally forms a cylindrical body when in the inflated configuration. The cylindrical body configuration, combined with the plurality of seal members 14 disposed along the outer surface 16 of the enclosed structure 12 and engaged with an inner surface 18 of the fluid vessel 20 when in the inflated configuration, combine to substantially prevent canting of the apparatus 10 when the apparatus is translated in the longitudinal direction within the fluid vessel 20, described below. Referring to FIG. 13, the end members 70 may be fixedly attached to the inside surfaces 62, 64 of the enclosed structure 12 by being glued or otherwise fixed thereto. For example, the end members 70 may further be bolted to the enclosed structure using bolts 76. Where bolts 76 are used, the bolts may be disposed in through holes 82 formed in the end members 70, in which case the through holes are made to be air tight to prevent fluid leakage. Also, the interface 80 between the enclosed structure 12 and the end member 70 is made to be air tight. Threaded bolts 84 may also be used which engage corresponding threaded holes (i.e., not through holes) in the end members 70, in which case only the interface 80 between the enclosed structure and the end members 70 are made to be air tight.

Figure 14:
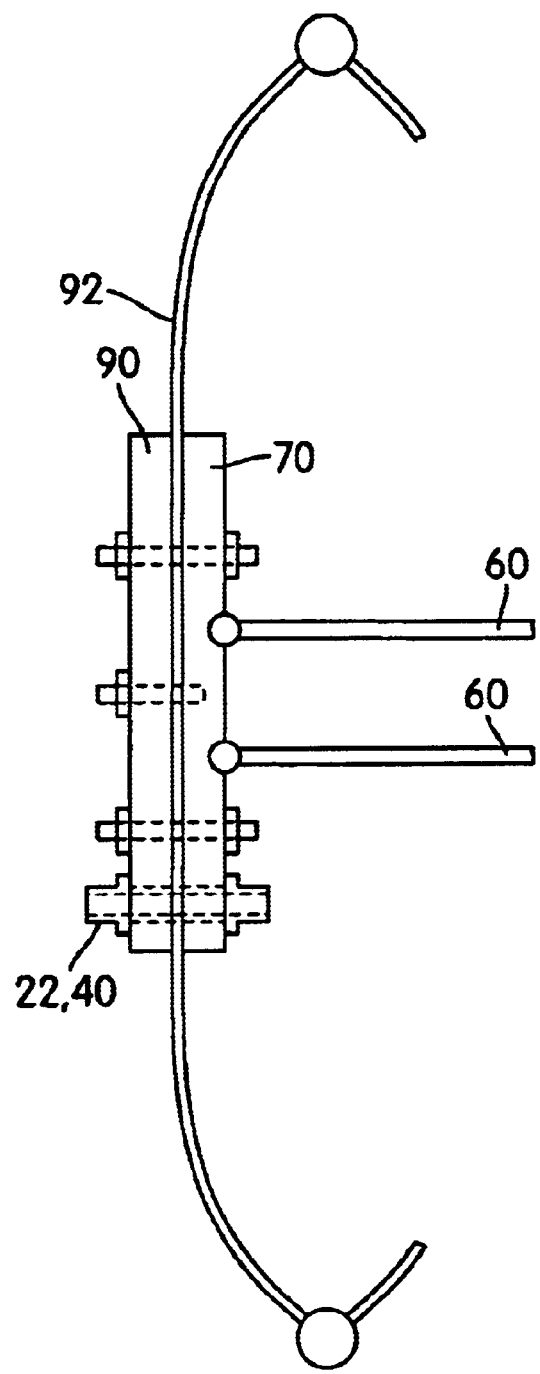
FIG. 14 is a cross sectional view of a end member and second end member of the apparatus of FIG. 1.
Figure 15:
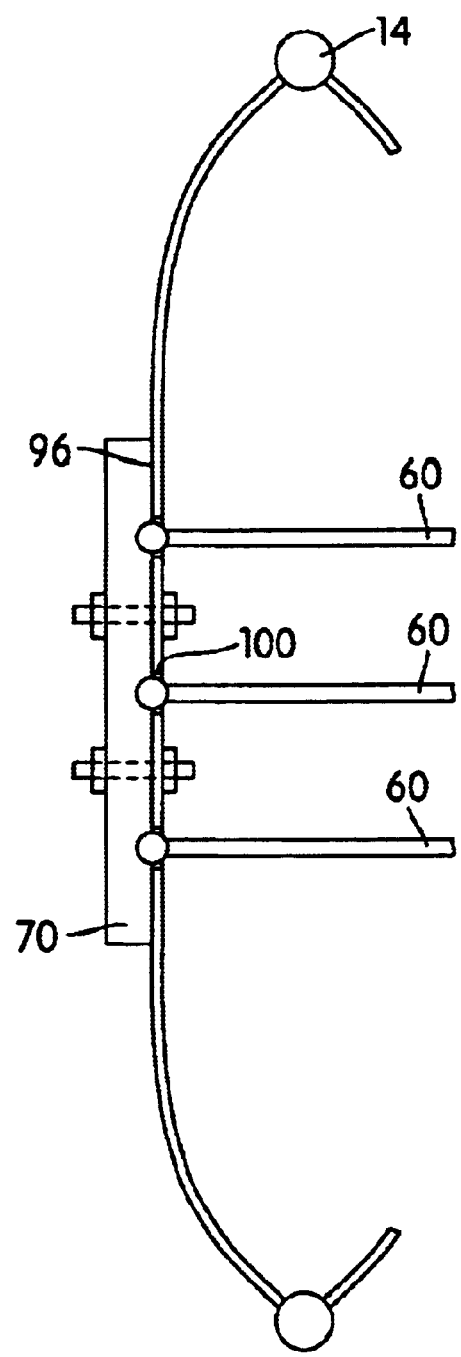
FIG. 15 is a cross sectional view of the end member of FIG. 13 showing another attachment configuration.
Figure 16:
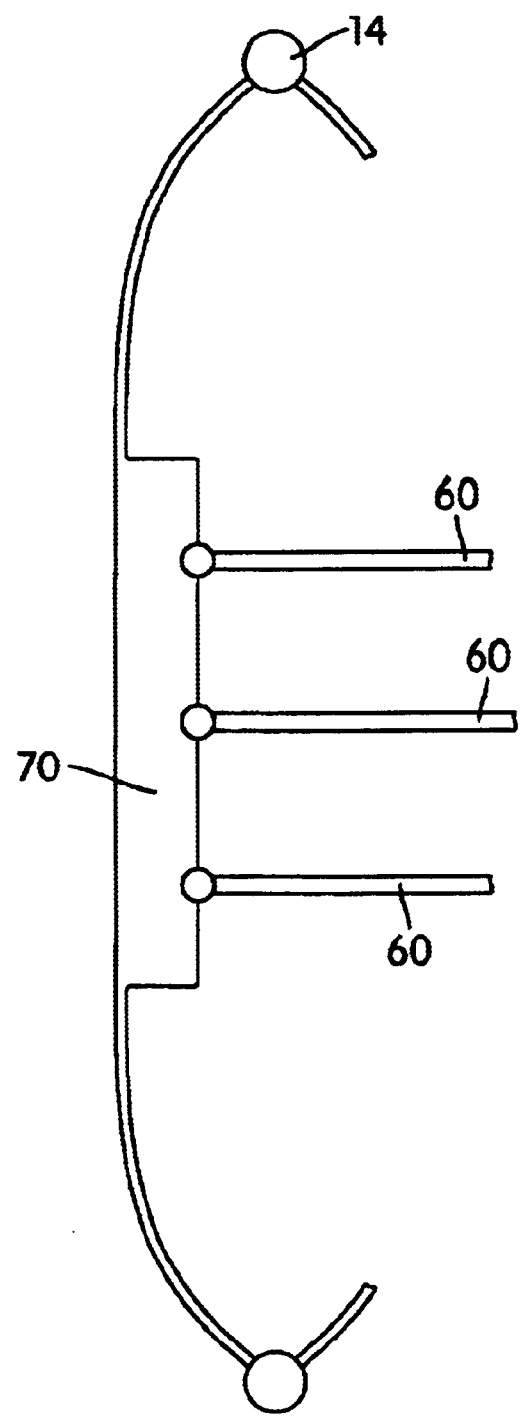
FIG. 16 is a cross sectional view a end member integrally formed with the enclosed structure of the apparatus.

As shown in FIG. 14, where the end members 70 are attached within the enclosed structure 12, each end 34, 36 of the enclosed structure may be sandwiched between the end member 70 and second end members 90, the second end members being disposed on the outside surface 92 thereof. The second end members 90 may be of any shape, including disk shaped. Each end member 70, enclosed structure 12, and second end member 90 are fixedly attached to each other by being bolted or otherwise fixedly attached, as described above. Alternatively, as shown in FIG. 15, each end member 70 may be fixedly attached to the outside surface 92 of the enclosed structure 12 at an end 34, 36 thereof. In this case, the enclosed structure 12 is fixedly attached to the inner surface 96 of the end member 70 (in an air tight manner), and the enclosed structure includes a through hole 100 positioned at the approximate center of the end member for allowing attachment of the support member 60 thereto. In another embodiment shown in FIG. 16, the end member 70 may be integrally formed with the enclosed structure 12, thus providing rigid central portion of each end 34, 36 of the enclosed structure.

The valves 22 and 40 may be mounted in an air tight manner to the end members 70 (FIG. 13) and to second end members 90 and end members 70 (FIG. 14).

Figure 17:
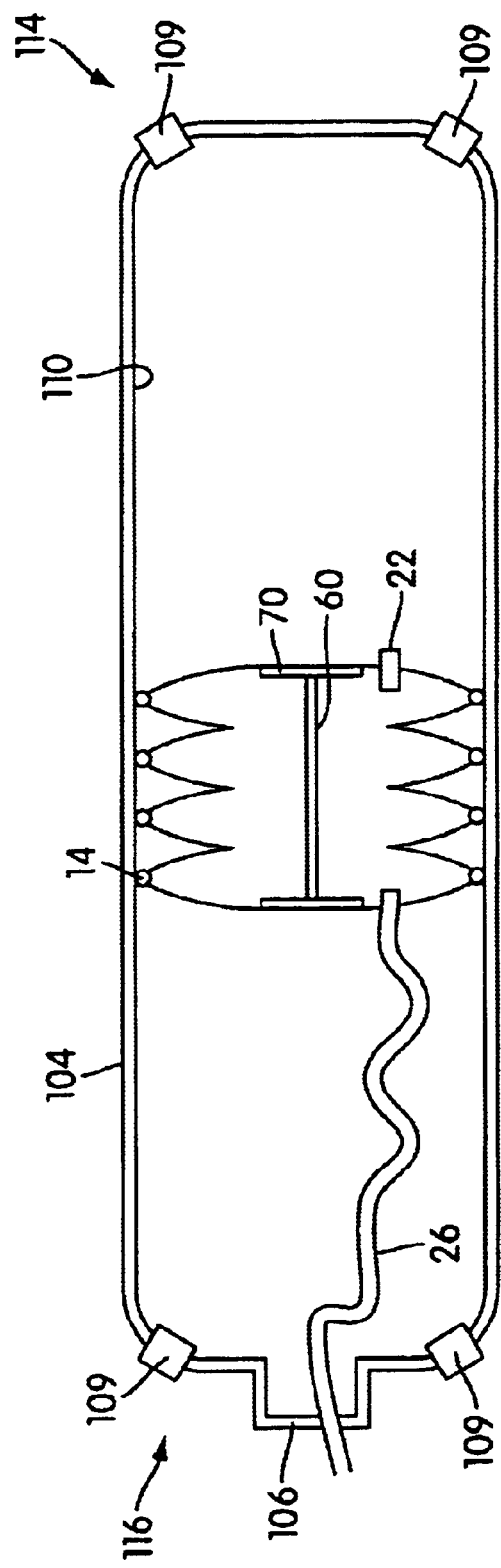
FIG. 17 is a cross sectional view of the apparatus of FIG. 1 shown in substantially the inflated configuration and within a tank.
Figure 18:
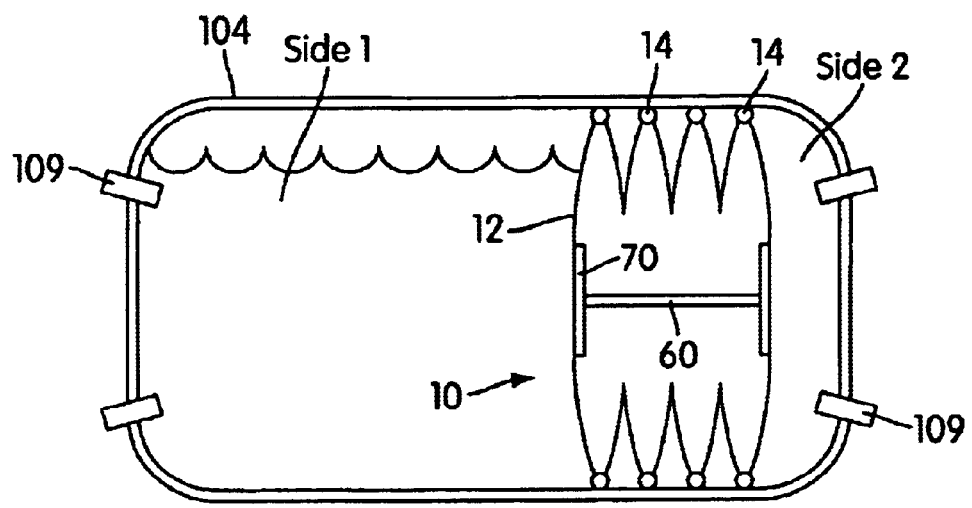
FIG. 18 is a cross sectional view of the apparatus of FIG. 17 depicting fluid contained within the tank.
Figure 19:
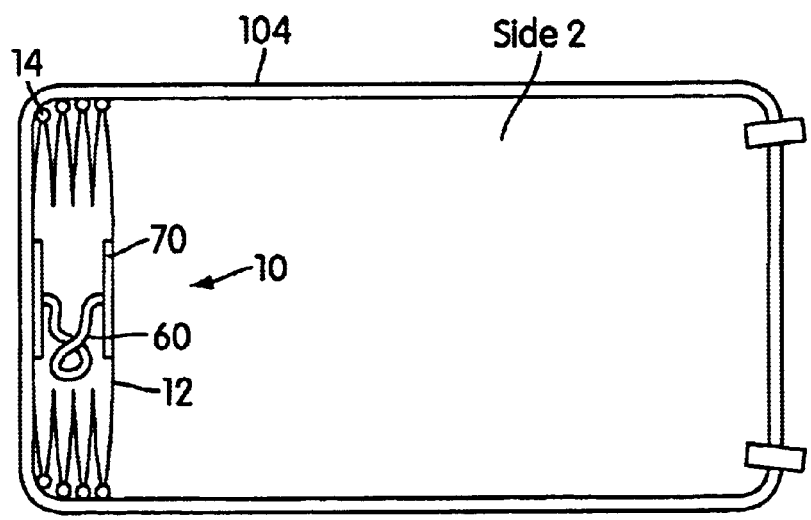
FIG. 19 is a cross sectional view of the apparatus of FIG. 17 shown partially collapsed.

The apparatus 10 of the present invention may be used in a variety of applications. In one application, shown schematically in FIG. 17, the fluid vessel 20 may be a given tank 104 for storing a fluid. In this application, the appropriately sized apparatus 10 may be inserted into the tank 104 through a hatch or other opening 106 formed in the tank while the apparatus 10 is in the collapsed configuration. The end members 70 must also be appropriately sized to fit through the opening 106. Pressurized fluid, such as a gas or a hydraulic fluid, is then received within the enclosed structure 12 of the apparatus 10 via the hose 26 until the enclosed structure 12 is in the inflated configuration. In the inflated configuration, the seal members 14 are slidably engaged with the inner surface 110 of the tank 104 and form a fluid tight seal therebetween. As will be understood by those skilled in the art, the pressure within the enclosed structure required to provide a fluid tight seal will vary depending on the diameter of the apparatus 10 (which is determined by the diameter of fluid vessel) and the density of the fluid to be stored and dispensed. The apparatus 10 may then be translated to either end 114, 116 of the tank by applying, for example, pressurized gas within the tank. A commodity fluid, for example, may then be introduced into the tank 104, which is generally indicated as side 1 in FIG. 18. Alternatively, the commodity fluid may be introduced into the tank 104 prior to moving the apparatus 10, in which case the force of the commodity fluid would push the apparatus through the tank and to an end 114, 116 thereof. To subsequently remove this commodity fluid, pressurized gas is introduced into the opposite side of the tank (side 2) at a pressure sufficient to cause translation of the apparatus 10, and the fluid exits the tank through, for example, orifices 109 (or valves) located at each end 114, 116 of the tank. It is noted that the pressure within the enclosed structure 12 of apparatus 10 is high enough so that the apparatus substantially maintains its shape (i.e., the inflated configuration) and the seal members 14 maintain their fluid tight seal against the inner surface 110 of the tank 104. As the apparatus 10 translates, the seal members 14 prevent the commodity fluid contained in side 1 from entering side 2. When the commodity fluid is substantially removed from the tank, i.e., the apparatus 10 is located at an the end of the tank, the internal pressure of the enclosed structure 12 of the apparatus 10 may be released so that the apparatus partially collapses in an "accordion" manner, as shown in FIG. 19. By partially collapsing in this manner, the tank's volume in side 2 is maximized for the introduction of the commodity fluid. The enclosed structure 12 of the apparatus 10 may be partially collapsed in an accordion manner at the outset so that the tank's volume in side 1 is also maximized prior to the introduction of the commodity fluid into the tank. It can be appreciated that the apparatus 10 of the present invention can be collapsed, by releasing the pressurized fluid therefrom, and removed from the given tank 104 and installed in another comparably sized fluid vessel, allowing for great flexibility of usage for a single apparatus 10. It will be understood to those skilled in the art that the application described above is not intended to be limiting, but is rather intended as a possible application of the apparatus 10 of the present invention.

For example, it will be understood by those skilled in the art that two fluids may be stored in side 1 and side 2 of the tank simultaneously, the two fluids being kept separate by the seal members 14 of the apparatus 10. Further, it will be understood by those skilled in the art that the apparatus 10 may be used in a fluid vessel that was not initially designed to store two separate fluids. In another application, the fluid vessel 20 may be a pipe, as generally shown in FIG. 4. The apparatus 10, while in the collapsed configuration, is placed within the pipe and then pressurized to the inflated configuration to create a fluid tight seal between the seal members and the inner surface 18 of the pipe. In this case, the apparatus may used in a "pigging" operation, where the apparatus is used for separating products, such as, for example, gasolines, fuel oils, crude oils, jet fuels and other petroleum products transported through a pipeline. The apparatus 10 may then be caused, using, for example, air pressure injected within the pipe on one side of the apparatus, to translate within the pipe in order to remove residual fluid from the pipeline when changing to another product.

The apparatus 10 may also be disposed within a 55 gallon drum containing stored fluid. The apparatus may be installed within the drum, as describe above, inflated, and used to drive the stored fluid from the drum.

Figure 20:
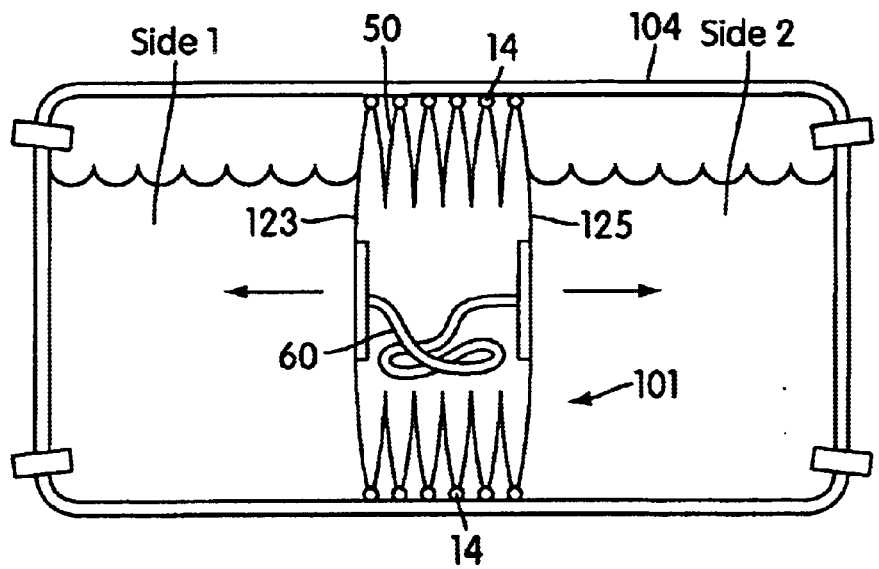
FIG. 20 is a cross sectional view of a third embodiment of the apparatus according to the present invention.
Figure 21:
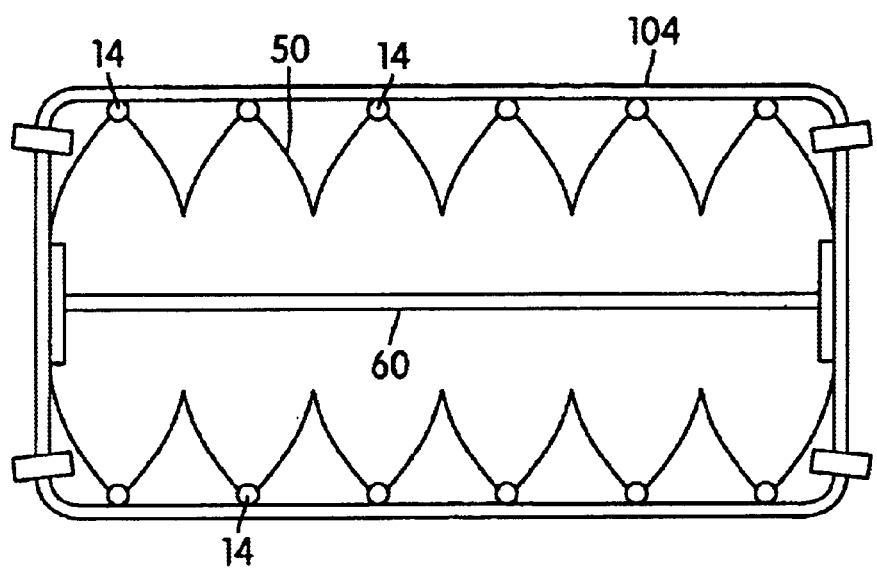
FIG. 21 is a cross sectional view of the apparatus of FIG. 20 shown expanded within the fluid vessel.

In another embodiment shown in FIGS. 20 and 21, the apparatus is constructed and arranged so that the when inflated, the apparatus radially expands to the inflated configuration, as described above, and further expands longitudinally (as indicated by the two arrows in FIG. 20) within the fluid vessel 104 and drives the fluid stored on either side of the apparatus out of the fluid vessel. In this embodiment, the apparatus 101 includes a sufficient number of radially protruding portions 50, which together with their flexibility, enable the apparatus to expand, via an internal pressure, in an "accordion" like manner to drive the fluid from the fluid vessel. As such, the step of pressurizing the fluid vessel 104 with a gas in order to translate the apparatus 101 within the fluid vessel is not required. The apparatus 101 may be appropriately sized to substantially occupy the volume of the the fluid vessel when expanded, as shown in FIG. 21, so that it is capable of driving substantially all of the fluid from the fluid vessel through longitudinal expansion thereof.

Alternatively, the apparatus 101 may be sized so that when fully longitudinally expanded, its volume is smaller than the volume of the fluid vessel and thus the apparatus does not fully occupy the fluid vessel 104. With such a configuration, since the longitudinal expansion of the apparatus 101 may not purge all the fluid from the fluid vessel, the remainder of the fluid may be driven from the fluid vessel 104 by pressurization thereof, as described above, in order to translate the apparatus and force the remaining fluid from the fluid vessel.

Figure 22:
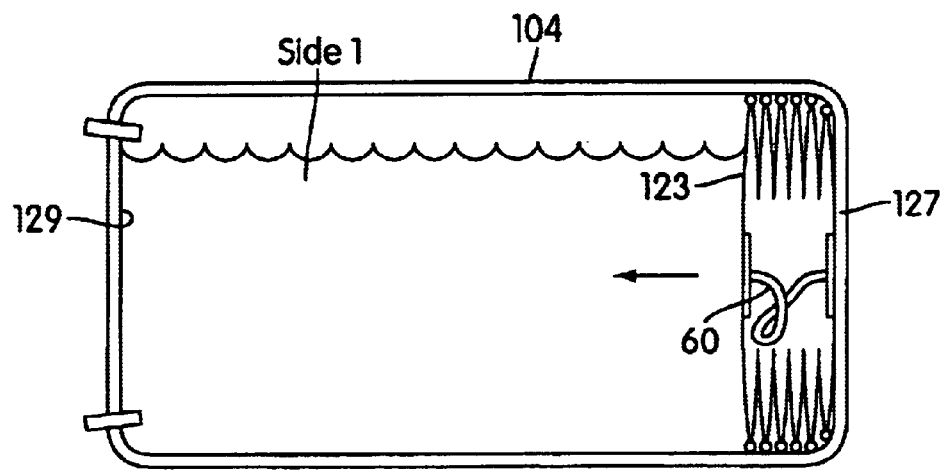
FIG. 22 is a cross sectional view of the apparatus of FIG. 20 shown in a partially collapsed configuration.
Figure 23:
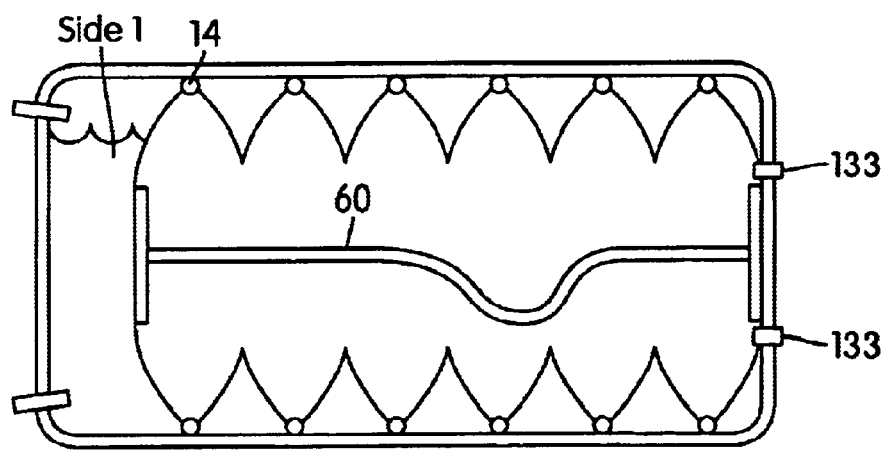
FIG. 23 is a cross sectional view of the apparatus of FIG. 22 shown in a partially expanded configuration.

As will be understood by those skilled in the art, both ends 123, 125 of the apparatus may expand longitundially away from each other to drive the fluid from both sides 1 and 2 of the fluid vessel (FIG. 20). Alternatively, as shown in FIG. 22, the apparatus 101 may be positioned adjacent an inside end 127 of the fluid vessel 104 and expanded, via an internal pressure, longitudinally in one direction, as indicated by the arrow. Here, upon interval pressurization of the apparatus 101, the apparatus expands in an "accordion" like manner, "pushing off" from inside end 127 of the fluid vessel. That is, for example, end 125 of the apparatus 101 maintains engagement with inside end 127 of the fluid vessel 104 and end 123 moves away from end 127 upon expansion of the apparatus to drive the fluid from the vessel. The apparatus 101 may be appropriately sized so that it can occupy substantially the entire fluid vessel when expanded.

To facilitate the above longitudinal expansion, either end 123, 127 of the apparatus 101 may be fixedly attached to an inside end 127, 129 of the fluid vessel 101. For example, FIG. 22 shows end 125 of the apparatus 101 fixedly attached to end 127 of the fluid vessel with one or more mechanical fasteners 133, as is known in the art. The mechanical fasteners 133 may be such that the apparatus 101 can be removably fastened to the inside of the fluid vessel 104, thereby maintaining the portability of the apparatus.

Figure 24:
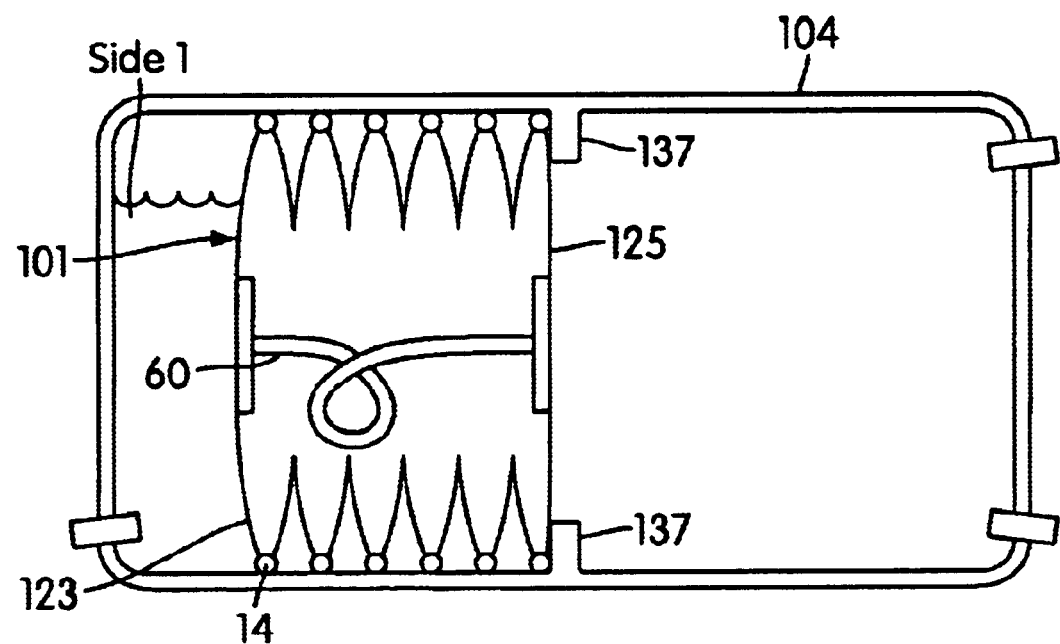
FIG. 24 is a cross section view of the apparatus of FIG. 20 shown mounted within the fluid vessel.

It will also be understood by those skilled in the art that the ends 123, 125 of the apparatus, rather than being fixed to an end 127, 129 of the fluid vessel, may be mounted within the fluid vessel at any location. For example, as shown in FIG. 24, the fluid vessel 104 may include a protruding portion 137 disposed between the ends 127, 129 of the fluid vessel for which an end 125 may be engaged with or attached to.

While the invention has been described with reference to the certain illustrated embodiments, the words which have been used herein are words of description, rather than words or limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A method for forcing a first fluid from a portion of a fluid vessel, said fluid vessel including a vessel body having a wall bounding an interior space for receiving the first fluid, said method comprising:

disposing an inflatable and collapsible enclosed structure in a deflated or partially inflated configuration within said interior space;

inflating said enclosed structure to an inflated configuration so as to engage at least one seal member protruding from the outer surface of said enclosed structure with an inner surface of said wall to provide a fluid tight seal therebetween; and pressurizing the fluid vessel on one side of said enclosed structure with a second fluid of sufficient pressure to cause translation of said enclosed structure within said fluid vessel to forcibly drive the first fluid from the fluid vessel with the at least one seal member sliding along the wall to maintain said fluid tight seal.

2. The method of claim 1, further comprising:
expanding said enclosed structure longitudinally within said fluid vessel to forcibly drive the first fluid therefrom by the longitudinal expansion thereof.

3. A fluid vessel, comprising:
a vessel body having a wall bounding an interior space for receiving a fluid;
an inflatable and collapsible enclosed structure disposed within said interior space, said enclosed structure being constructed and arranged to transition between an inflated configuration and a collapsed configuration when a pressurized fluid is received therein and released therefrom, respectively;
at least one seal member protruding from an outer surface of said enclosed structure, said at least one seal member being slidably engaged with an inner surface of the wall to produce a fluid tight seal therebetween;
said enclosed structure being constructed and arranged to expand longitudinally within said fluid vessel when transitioning to the inflated configuration to forcibly drive the fluid from the vessel with the at least one seal member sliding along the wall to maintain said fluid tight seal.

4. A fluid vessel according to claim 3, wherein said enclosed structure is adapted to expand to a volume that is smaller than a volume of the vessel body when expanded longitudinally.

5. A fluid vessel according to claim 3, wherein said enclosed structure is adapted to expand to a volume that is substantially the same as a volume of the vessel body when expanded longitudinally.

6. A fluid vessel according to claim 3, wherein an end of said enclosed structure is adapted to be fixedly attached to the vessel body such that said enclosed structure expands longitudinally in one direction.

7. A fluid vessel according to claim 3, wherein said enclosed structure has opposing ends, said enclosed structure being structured such that the opposing ends are adapted to expand longitudinally away from one another to forcibly drive fluid from both opposing ends of said enclosed structure.

8. A fluid vessel according to claim 3, wherein said vessel body is pressurized with a second fluid of sufficient pressure to cause translation of said enclosed structure within said vessel body.

9. A method for forcibly driving fluid from an interior space of a fluid vessel, the vessel comprising a wall bounding the interior space and containing a fluid in the interior space, the method comprising:
providing an inflatable and collapsible enclosed structure in a deflated or partially inflated configuration within said space; and
inflating said enclosed structure to an inflated configuration so as to engage at least one seal member provided on the outer surface of said enclosed structure with an inner surface of said wall to provide a fluid tight seal therebetween and also to expand said enclosed structure longitudinally within said fluid vessel to forcibly drive the fluid from the vessel by the longitudinal expansion with the at least one seal member sliding along the wall to maintain said fluid tight seal.

* * * * *